Nov. 14, 1933.                    B. MEIS                    1,935,514
DECORATIVE PLANT PRODUCT
Filed Jan. 18, 1933
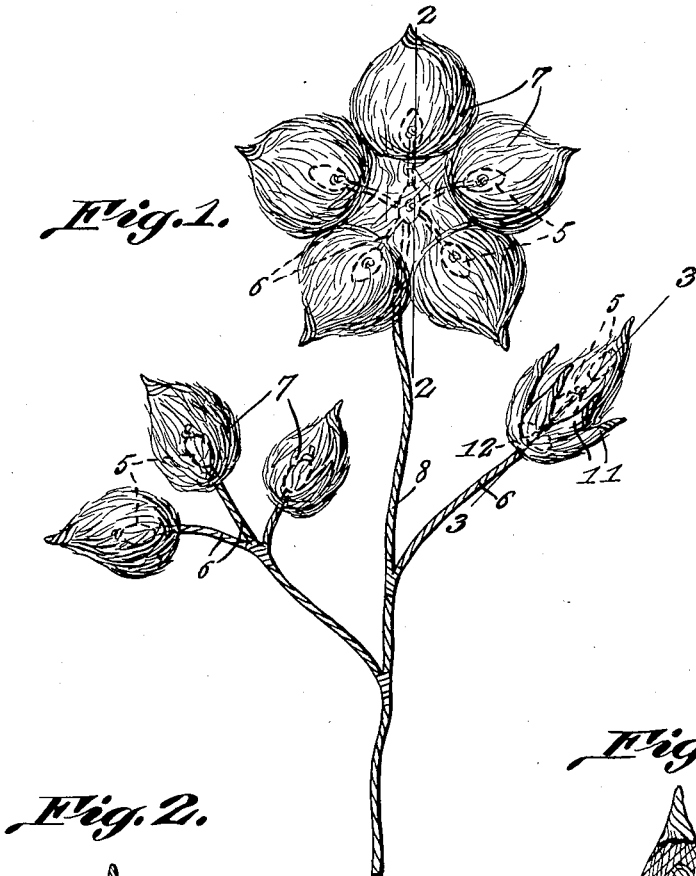
Fig. 1.
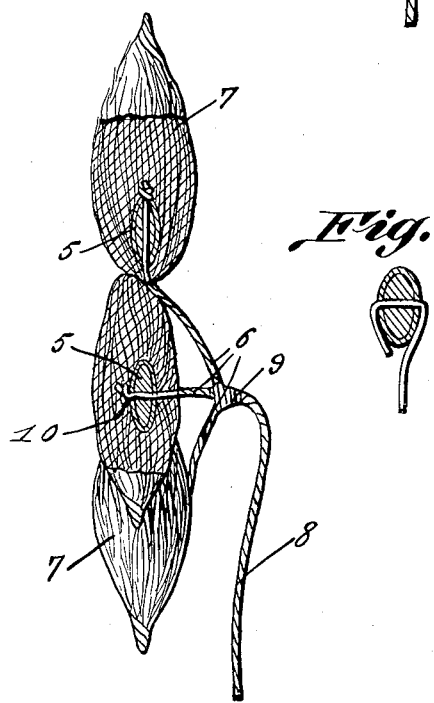
Fig. 2.
Fig. 4.
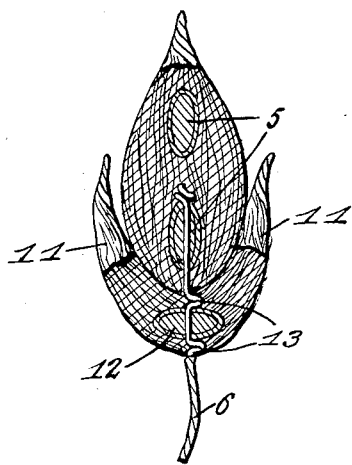
Fig. 3.
Barbara Meis, INVENTOR
BY Victor J. Evans & Co.
ATTORNEY Patented Nov. 14, 1933

1,935,514

UNITED STATES PATENT OFFICE 1,935,514

DECORATIVE PLANT PRODUCT

Barbara Meis, Tecumseh, Okla.

Application January 18, 1933. Serial No. 652,369

3 Claims. (Cl. 41—13)

The invention relates to a decorative plant product and more especially to a decorative novelty.

The primary object of the invention is the provision of a product of this character, wherein the cotton seed is so utilized as to enable the same to constitute a base for the formation of artificial flower make-up or a decorative novelty.

Another object of the invention is the provision of a product of this character which is extremely simple in the making, neat and attractive in appearance, designed for decorative purposes for the production of artificial flowers and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claims hereunto appended.

In the accompanying drawing:

Figure 1 is an elevation of a decorative product constructed in accordance with the invention.

Figure 2 is an enlarged sectional view on the line 2—2 of Figure 1.

Figure 3 is a sectional view on the line 3—3 of Figure 1.

Figure 4 is a detail sectional view.

Similar reference characters indicate corresponding parts throughout the several views in the drawing.

Referring to the drawing in detail, the product is an imitation in this instance of a natural flower yet it may be in the form of another novelty, and constitutes the present invention.

In the construction of the artificial flower there is employed the natural cotton seeds 5, a group of which being threaded upon strands of material 6, these in their make-up constituting branches for the flower buds 7. The branches 6 are joined with the stem 8 of twisted material, the juncture 9 therebetween being had by twists of material. It is of course to be understood that the strands of the branches 6 may be plural in number and twisted correspondingly to the twists of the strands of the stem 8. The seeds 5 as connected with the strands 6 have the latter trained therethrough either longitudinally or transversely of the same and the terminal of each branch 6 is knotted at 10 to prevent the separation of the seed 5 from the branch.

Each branch may or may not support petals 11, these being formed from cotton densified and twisted to give character thereto and also for the shaping of the same. The petals 11 have as their base the cotton seed 12 which is anchored upon the branch 6 by having the latter threaded therethrough and held by bights 13.

The branches 6 and the stem 8 may be distorted or bent to give a natural appearance to a natural flower plant and in the completed make-up the artificial product simulates such natural flower plant.

The bud 7 is made from cotton material and likewise the petals 11 of the product.

What is claimed is:

1. A product of the character described comprising a plurality of strands forming branches of an artificial flower plant, twisted strands of material constituting a stem and having the branches joined therewith, natural cotton seeds mounted on the branches, and artificial buds formed about the cotton seeds.

2. A product of the character described comprising a plurality of strands forming branches of an artificial flower plant, twisted strands of material constituting a stem and having the branches joined therewith, natural cotton seeds mounted on the branches, artificial buds formed about the cotton seeds, and artificial flower petals also formed about certain of the cotton seeds.

3. A product of the character described comprising a plurality of strands forming branches of an artificial flower plant, twisted strands of material constituting a stem and having the branches joined therewith, natural cotton seeds mounted on the branches, artificial buds formed about the cotton seeds, artificial flower petals also formed about certain of the cotton seeds, and knots provided in the branches to anchor the cotton seeds thereon.

BARBARA MEIS.